US012775930B1

(12) United States Patent
Allen

(10) Patent No.: US 12,775,930 B1
(45) **Date of Patent: *Oct. 27, 2026**

(54) INTERMEDIARY PAYMENT SYSTEM AND METHOD FOR PROTECTING A PAYOR'S PAYMENT CARD DATA

(71) Applicant: VPay, Inc., Plano, TX (US)

(72) Inventor: Robert M. Allen, Plano, TX (US)

(73) Assignee: VPay, Inc., Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/199,590

(22) Filed: May 19, 2023

Related U.S. Application Data

(63) Continuation of application No. 17/229,076, filed on Apr. 13, 2021, now Pat. No. 11,663,582, which is a continuation of application No. 15/065,634, filed on Mar. 9, 2016, now Pat. No. 11,004,063, which is a continuation-in-part of application No. 14/827,861, filed on Aug. 17, 2015, now abandoned, which is a continuation-in-part of application No. 14/179,132, filed on Feb. 12, 2014, now abandoned, which is a continuation of application No. 14/028,040, filed on Sep. 16, 2013, now Pat. No. 8,694,431.

(60) Provisional application No. 62/038,240, filed on Aug. 16, 2014, provisional application No. 61/704,765, filed on Sep. 24, 2012.

(51) Int. Cl.
*G06Q 40/00* (2023.01)
*G06Q 20/34* (2012.01)
*G06Q 20/40* (2012.01)

(52) U.S. Cl.
CPC ........... *G06Q 20/351* (2013.01); *G06Q 20/40* (2013.01)

(58) Field of Classification Search
None
See application file for complete search history.

(56) References Cited

U.S. PATENT DOCUMENTS 5,590,196 A 12/1996 Moreau
5,677,955 A 10/1997 Doggett et al.
5,832,460 A 11/1998 Bednar et al.
5,890,129 A 3/1999 Spurgeon
5,956,699 A 9/1999 Wong et al.
6,003,007 A 12/1999 Dirienzo
6,901,387 B2 5/2005 Wells et al.
7,380,707 B1 6/2008 Fredman
7,752,134 B2 7/2010 Spear
(Continued)

FOREIGN PATENT DOCUMENTS

EP 1049056 A2 11/2000

OTHER PUBLICATIONS

The Evolution of Interchange Feesâ (Year: 2010).*
(Continued)

*Primary Examiner* — Olabode Akintola
(74) *Attorney, Agent, or Firm* — ALSTON & BIRD LLP

(57) ABSTRACT

A payment intermediary vaults credit card data of a consumer for regular, simplified payments to one or more merchants. Consumer authorizes intermediary to charge the credit card so that intermediary can, in turn, pay a selected merchant. Intermediary tracks the interchange fees incurred on the first card transaction (between consumer and intermediary) and then automatically selects a payment card account with a higher interchange rate than that incurred on the first card transaction to pay merchant.

21 Claims, 8 Drawing Sheets

(56) References Cited

U.S. PATENT DOCUMENTS

| | | | | |
|---|---|---|---|---|
| 8,204,766 | B2 | 6/2012 | Bush | |
| 8,249,893 | B1 | 8/2012 | Allen | |
| 8,447,673 | B1 * | 5/2013 | Horbal | G06Q 30/00 705/35 |
| 8,694,431 | B1 | 4/2014 | Allen et al. | |
| 9,483,783 | B1 * | 11/2016 | Power | G06Q 30/0601 |
| 11,004,063 | B1 | 5/2021 | Allen | |
| 11,663,582 | B1 | 5/2023 | Allen | |
| 2001/0034618 | A1 | 10/2001 | Kessler et al. | |
| 2002/0096570 | A1 | 7/2002 | Wong et al. | |
| 2002/0194027 | A1 | 12/2002 | Smith | |
| 2004/0133507 | A1 | 7/2004 | Barbour | |
| 2004/0249745 | A1 | 12/2004 | Baaren | |
| 2005/0033604 | A1 | 2/2005 | Hogan | |
| 2005/0209964 | A1 | 9/2005 | Allen et al. | |
| 2005/0261944 | A1 | 11/2005 | Rosenberger | |
| 2006/0010016 | A1 | 1/2006 | Kossol et al. | |
| 2006/0020542 | A1 | 1/2006 | Litle et al. | |
| 2007/0005402 | A1 | 1/2007 | Kennedy et al. | |
| 2009/0037324 | A1 | 2/2009 | McLaughlin et al. | |
| 2009/0222353 | A1 | 9/2009 | Guest et al. | |
| 2010/0010918 | A1 * | 1/2010 | Hunt | G06Q 30/0643 705/26.1 |
| 2010/0088204 | A1 | 4/2010 | Nambiar et al. | |
| 2011/0106609 | A1 | 5/2011 | Fernandez | |
| 2012/0078795 | A1 * | 3/2012 | Mann, III | G06Q 20/385 705/44 |
| 2012/0136781 | A1 * | 5/2012 | Fridman | G06Q 20/10 705/40 |
| 2012/0226535 | A1 | 9/2012 | Subbarao et al. | |
| 2012/0254034 | A1 | 10/2012 | Statland et al. | |
| 2014/0164235 | A1 | 6/2014 | Allen et al. | |
| 2015/0242843 | A1 * | 8/2015 | Parento | G06Q 20/26 705/21 |

OTHER PUBLICATIONS

"The Evolution of Interchange Fees" (Year: 2010).*

"AP vPayment XML Supplier Training", GE Corporate Payment Services, dated Jan. 26, 2005.

Armour, Stephanie. "Patients Pay Before Seeing Doctor As Deductibles Spread," Bamboo Innovator, Oct. 14, 2013, (2 pages), [Retrieved from the Internet Jul. 18, 2023] <URL: https://bambooinnovator.com/2013/10/14/patients-pay-before-seeing-doctor-as-deductibles-spread/>.

Decision Denying Institution of Covered Business Method Patent Review, Case CBM2013-00047 Patent RE43,904, Entered: Feb. 18, 2014, pp. 1-24.

Decision Denying Institution of Inter Partes Review, Case IPR2014-01414 Patent RE43,904 E, Entered: Mar. 4, 2015, pp. 1-24.

Decision Institution of Inter Partes Review Case, IPR2015-00569 Patent RE44,748 E, Entered: Jul. 31, 2015, pp. 1-36.

District Court's Order responsive to Motion for Summary Judgment in C.A. No. 8:13-cv-2240-T-33MAP pp. 1-30.

Joint Claim Construction and Prehearing Statement, *Stoneeagle Services, Inc.* v *Gillman, et al.*, Civil Docket No. 3:11-CV-2408-P-BD (N.D. Texas).

Petition for Covered Business Method Review as filed with the United States Patent Trial and Appeal Board in re Post-Grant Review of corresponding U.S. Pat. No. RE43,904 on Aug. 19, 2013.

Visa Commercial Solutions: Merchant Category Codes for IRS Form 1099-MISC Reporting, Visa U.S.A. Inc., 2004.

* cited by examiner

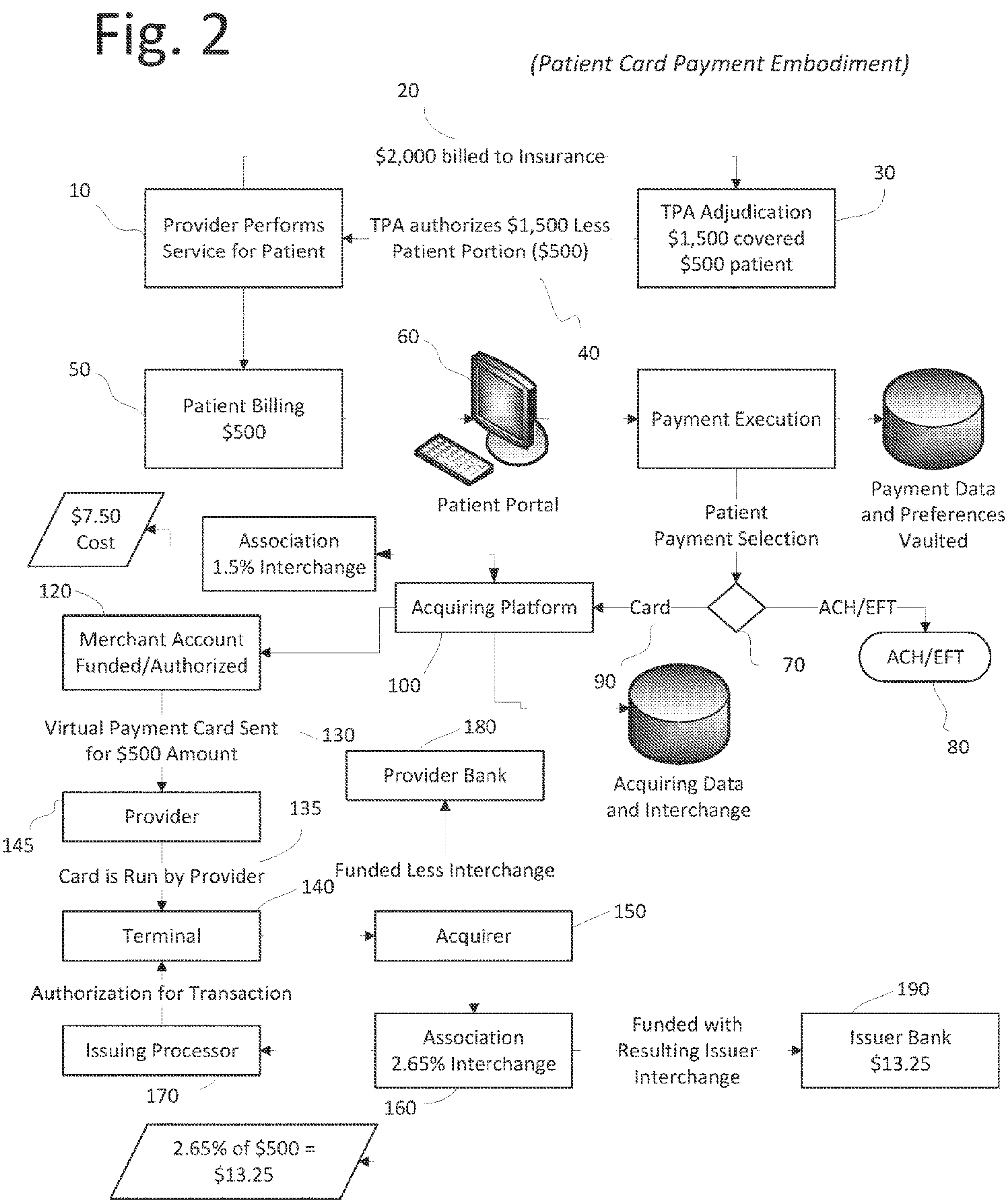
Fig. 2
(Patient Card Payment Embodiment)
20
$2,000 billed to Insurance
10
Provider Performs Service for Patient
TPA authorizes $1,500 Less Patient Portion ($500)
TPA Adjudication $1,500 covered $500 patient
30
40
60
50
Patient Billing $500
Patient Portal
Payment Execution
Payment Data and Preferences Vaulted
$7.50 Cost
Association 1.5% Interchange
Patient Payment Selection
120
Merchant Account Funded/Authorized
Acquiring Platform
Card
ACH/EFT
ACH/EFT
100
90
70
80
Virtual Payment Card Sent for $500 Amount
130
180
Provider Bank
Acquiring Data and Interchange
145
Provider
135
Card is Run by Provider
140
Funded Less Interchange
Terminal
Acquirer
150
Authorization for Transaction
190
Issuing Processor
Association 2.65% Interchange
Funded with Resulting Issuer Interchange
Issuer Bank $13.25
170
160
2.65% of $500 = $13.25

*(Patient Card Payment Embodiment)*

*(Patient ACH Payment Embodiment)*

*(Patient Card Payment Embodiment)*

INTERMEDIARY PAYMENT SYSTEM AND METHOD FOR PROTECTING A PAYOR'S PAYMENT CARD DATA

PRIORITY CLAIM

This non-provisional application is a continuation of U.S. Non-Provisional application Ser. No. 17/229,076 filed Apr. 13, 2021 entitled "Intermediary Payment System And Method For Protecting A Payor's Payment Card Data," which is a continuation of U.S. Non-Provisional application Ser. No. 15/065,634 filed Mar. 9, 2016 entitled "Intermediary Payment Method using Interchange Differential," which is a continuation-in-part of U.S. Non-Provisional application Ser. No. 14/827,861 filed Aug. 17, 2015 entitled "Intermediary Payment Method using Interchange Differential." application Ser. No. 14/827,861 claims priority to U.S. Provisional Patent Application Ser. No. 62/038,240 filed Aug. 16, 2014. Application Ser. No. 14/827,861 is also a continuation-in-part of U.S. patent application Ser. No. 14/179,132 filed Feb. 12, 2014 entitled "Dynamic bin allocation for payment card transactions," which was a continuation of U.S. patent application Ser. No. 14/028,040 filed Sep. 16, 2013, now U.S. Pat. No. 8,694,431, which claims priority to U.S. Provisional Patent Application Ser. No. 61/704,765 filed Sep. 24, 2012.

BACKGROUND OF THE INVENTION

1. Field of the Invention

This invention relates to payment processing. More specifically, it relates to providing an intermediary between a payor and payee that makes payments to payee using a virtual payment card account.

2. Brief Description of the Related Art

Consumers make regular and continuing payments to vendors by "vaulting" their credit card data to facilitate subsequent payments. For example, users that make frequent purchases of digital music and/or smartphone software "apps" enter in their credit card information with an online store such as APPLE COMPUTER's ITUNES brand service. The information will typically include the credit card number (PAN), its security code (CVC or CVC2), and expiration date. Additional information may include billing address verification (AVS) and the like. After this information is input the online store need only authenticate the user for subsequent authorized purchases. Vaulting of this data provides both security and convenience to both the consumer and the merchant.

However, vaulting of card data does require certain infrastructure and security implementations. Therefore, card data is typically vaulted by the merchant actually receiving payment from the consumer. Third party vaulting services exist but cost substantial fees depending on the number of gateways, transactions and cards supported (typically per month).

It would be advantageous if a third party intermediary could provide vaulting and payment facilitation between a consumer and a vendor without operating overhead, and alternatively, generating a profit. However, the problem is that card transactions themselves incur overhead called interchange. For example, when a doctor's office accepts a credit card for a $100 patient co-pay, the office does not receive $100. There are substantial infrastructure and risk-costs in processing a credit card transaction. These costs take the form of interchange which can vary based on the payment card itself and also the circumstances in which the card is processed. Therefore, the doctor's office may actually receive $97 on that $100 credit card transaction, wherein the $3-difference is the interchange fee. However, the doctor's office will usually gladly accept the credit card transaction because it settles the patient's financial obligation, it is widely expected by consumers and also permits the consumer flexibility in paying the amount.

However, if a third party intermediary "vaulted" the patient's credit card information and then made a separate payment on behalf of the patient, the intermediary would only get $97 from the first transaction. The intermediary would still need to pay the doctor's office $100 but it only netted $97 from the patient transaction.

Accordingly, a long felt but unfulfilled need exists for a third party platform to process vaulted credit cards on behalf of consumers to merchants. However, in view of the art considered as a whole at the time the present invention was made, it was not obvious to those of ordinary skill in the field of this invention how the shortcomings of the prior art could be overcome.

BRIEF SUMMARY OF THE INVENTION

An embodiment of the invention includes a method of effecting virtual card payments on behalf of a consumer whose card data has been vaulted. The steps include establishing an intermediary between a payor and a payee. The payor may be a consumer or another business seeking to make ongoing payments to one or more payees. The payee may be a vendor, merchant, service provider or the like. A first authorization is received for a first card payment by payor to the intermediary for a payment amount to the payee, the first card payment made using a card account selected by payor. For example, a consumer uses her own VISA card to pay $100 to a doctor's office through the intermediary. The payor's card account data is vaulted whereby it is keyed in to an online portal and stored in a database for future transactions. The card may also be of other types including, but not limited to, stored value cards, debit cards, and HSA (health savings account) cards.

The first card payment is processed in the $100 payment amount to the intermediary at a first interchange rate associated with payor's card account. In this example, we will set the first interchange rate at 1.75%, 1.75% of $100 equals a $1.75 interchange fee. That means the intermediary actually nets $98.25 in this first transaction.

The intermediary then sends a second card payment in the $100 payment amount to the payee. The second card payment is associated with a virtual payment card account having a second interchange rate. In this example, we will set the second interchange rate to 2.5%, 2.5% of $100 equals a $2.50 interchange fee. Therefore, while the intermediary lost $1.75 on the first transaction of the vaulted payor's card account, it gained $2.50 on the second transaction made to the payee thereby netting $0.75. Accordingly, the intermediary desires the second interchange rate to be greater than the first interchange rate. Adjusting the interchange rate is disclosed in U.S. Pat. No. 8,694,431 and co-pending U.S. patent application Ser. No. 14/179,132 filed Feb. 12, 2014, the specifications of which are incorporated herein by reference.

In another embodiment of the invention, prior to processing the first card payment, the intermediary evaluates whether the second interchange rate chargeable through the second card payment is greater than the first interchange rate and rejects the first card payment in the event the second interchange rate is less than or equal to the first interchange rate. The intermediary may also reject payor card account types having known interchange rates above a predetermined threshold.

In yet another embodiment of the invention, the intermediary varies the interchange rate of the second card payment by selecting a virtual card BIN having a preset interchange rate above that incurred by the payor's card.

In yet another embodiment of the invention, the intermediary processes the payor's card to minimize the interchange rate incurred to the intermediary. This may be done by the inclusion of interchange factors selected from the group consisting of enhanced data, debit personal identification number, address verification service, security code and timely settlement.

In yet another embodiment of the invention, the intermediary modifies the effective interchange rate of the second, virtual card payment by the inclusion or exclusion of interchange factors selected from the group consisting of card not present, enhanced data, debit personal identification number, address verification service, security code and delayed settlement.

In yet another embodiment of the invention, the intermediary sets a threshold delta between the payor's card interchange fees and the virtual card interchange fees, the threshold delta representative of the net profit incurred as the first transaction (payor's payment to intermediary) cascades to the second transaction (intermediary payment to payee). For example, a threshold delta of $0.01 may technically be a profit but may not cover the intermediary's overhead or profitability target. Therefore, unless the first transaction interchange can be lowered and/or the second transaction interchange be increased, the intermediary may automatically decline to process the payment from the payor to the payee.

While the present invention is not limited to healthcare service copays, deductibles, and co-insurance, it addresses the growing problems of bad debt suffered by medical professionals. In an Oct. 14, 2013 article from Bloomberg BNA (Patients Pay Before Seeing Doctor as Deductibles Spread, Armour, Stephanie) notes that higher-deductible health insurance plans are causing an increase in bad debt expense for medical providers. Hospitals provided $41 billion in care for which no payment was received in 2011 up from $3.9 billion in 1980. Medical professionals clearly need a new system to facilitate the receipt of copays, deductibles and co-insurance payments by the patient.

An advantage of the invention is that the consumer is not required to enroll with a service such as funding an account or establish a new cardholder relationship. Rather, the consumer simply uses the existing payment card he or she already has.

Another advantage of the invention is that the consumer need only provide their payment card information once to the intermediary where it is "vaulted." The consumer can then instruct the intermediary to make payments on the consumer's behalf or upon preselected conditions (e.g., automatically pay Merchant ABC up to $500 per billing cycle).

Yet another advantage of the invention is that most payment cards provide risk protection against fraud. The consumer has the protection of the consumer's own payment card in addition to the protection of using a virtual payment card when making payment to the payee on the consumer's behalf.

Yet another advantage of the invention is that consumers don't want to have to go to each one of their vendor's websites (or call them) to provide card information to make a payment to that particular vendor. The present invention enables them to go to one place to pay everybody where enrolling for funding is easy.

BRIEF DESCRIPTION OF THE DRAWINGS

For a fuller understanding of the invention, reference should be made to the following detailed description, taken in connection with the accompanying drawings, in which:

FIG. 2 is a diagrammatic view of an embodiment of the invention for patient card payment using an example payment amount.

DETAILED DESCRIPTION OF THE PREFERRED EMBODIMENT

Figure 1:
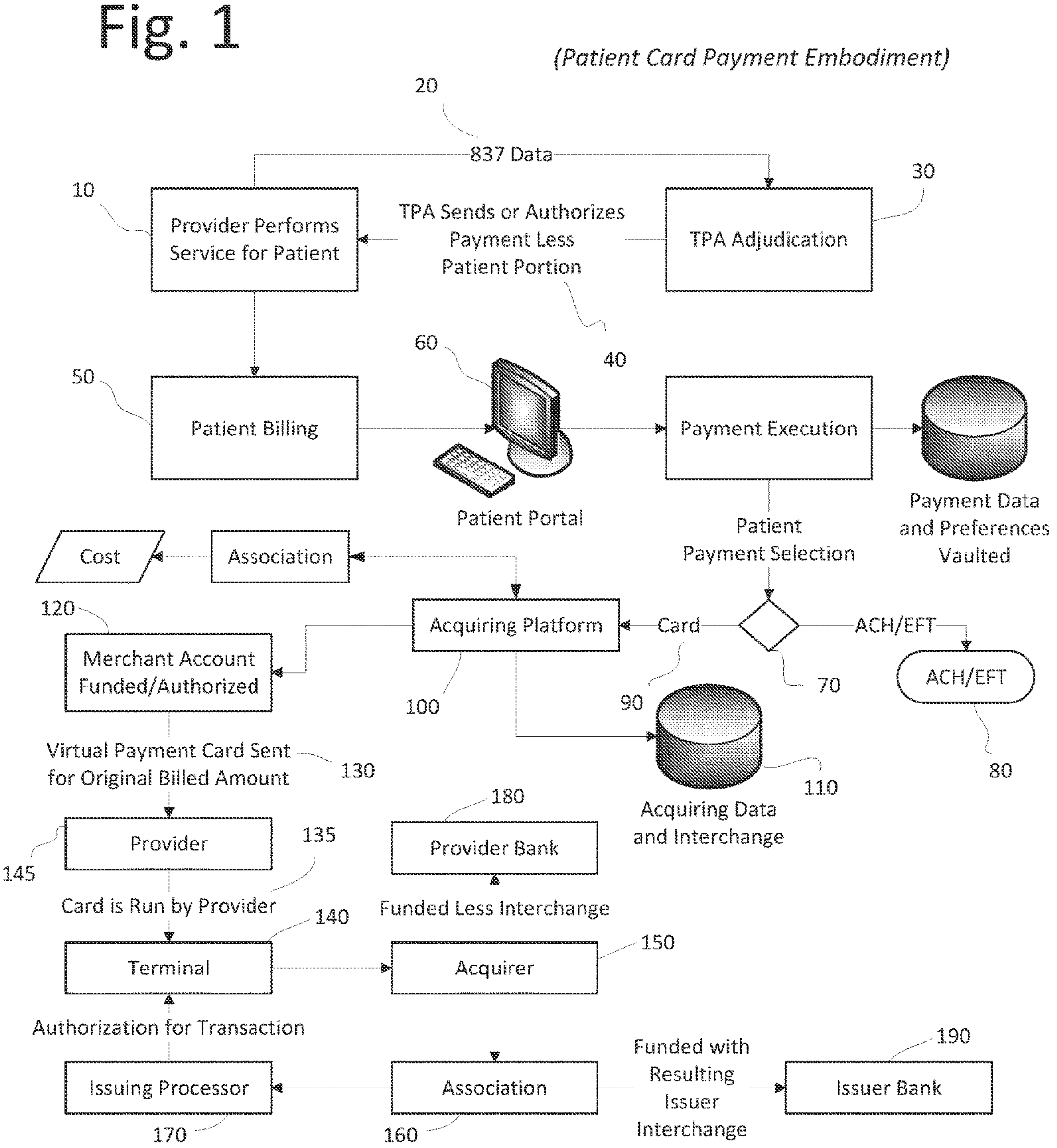
FIG. 1 is a diagrammatic view of an embodiment of the invention for patient card payment.

FIG. 1 illustrates an embodiment of the invention using a patient card payment. The patient card would typically be a credit card but could be other types of cards such as debit card, stored value card, HSA card or the like. It should also be noted that while the examples shown here illustrate the invention as applied to health care services the present invention is not limited to such field. For example, other industries could include travel, warranty repairs, and construction. The intermediary is also not limited to linking a consumer (patient) with a business (doctor's office). The intermediary can link a first business using a purchase card (Pcard) account with a second business. For example, a contractor may use the intermediary in this invention to pay various subcontractors and suppliers on a construction project.

Turning back to FIG. 1, a provider (e.g., doctor) performs a service for a patient 10 covered by an insurance policy. The provider wants to obtain payment from the insurance carrier, so it sends data about the service rendered in a formatted health care claim transaction set designated as 837. The 837 data (reference 20) is analyzed by a third party administrator (TPA) 30 on behalf of the insurance company. The TPA decides which services are covered, which are not covered and what portion of the covered services are payable by the insurance company. The TPA authorizes payment 40 to the provider for the services billed less the portion that is not covered which is the patient's responsibility. The TPA sends remittance advice or what is called an explanation of benefits (EOB). The provider then has to bill the patient 50 for his or her portion of the bill not covered by insurance (patient billing).

In an embodiment of the invention, the patient is directed to a patient portal 60 (typically a website but could also be other interfaces including smartphone applications or kiosks) where they can select 70 how they would like to pay their portion of the bill. They are offered payment by ACH/EFT 80 wherein money is withdrawn from the patient's checking or savings account. Alternatively, they may pay using an existing credit card 90. The payment data and preferences are "vaulted" or secured stored in a database for subsequent use without rekeying by the patient. In the embodiment of FIG. 1, the patient selected payment by credit card 90. The card data is submitted to an acquiring platform 100 that acts as an intermediary between the patient and the provider for payment. The acquiring platform is communicatively coupled to a card association such as VISA/MASTERCARD. The acquiring data and interchange for accepting the patient's card is stored in database 110. The amount of interchange incurred by accepting 120 the patient's card is important. This is because at this stage in the process, the intermediary is operating at a loss. Virtually every payment card transaction will incur some interchange. Therefore, the intermediary effectively receives less money from the patient than what the intermediary subsequently owes back to the provider on the patient's behalf.

Once the first transaction 120 occurs (patient card payment to intermediary) the intermediary generates a virtual payment card 130 authorized in the amount the patient paid to the intermediary (less interchange fees), wherein the virtual payment card is generated electronically and is not reduced to a physical plastic card. The virtual payment card is run at the provider's terminal 140 which sends it to an acquirer 150. The acquirer 150 passes the data through to the card association 160 and issuing processor 170 for authorization. The provider bank 180 is then funded with the payment less interchange fees charged in the second transaction. The interchange fees are sent to the issuer bank 190 which is that of the intermediary. Therefore, while the intermediary is almost always losing money on the first transaction 120, it is the second transaction 135 (and a greater interchange rate) that compensates for it on the second transaction 135.

In an alternative embodiment of the invention, intermediary may effect a straight through card payment to acquirer 150 skipping the need to use terminal 140 wherein the virtual card is not presented to the provider 145 but rather confirmation that the payment has already been made. In either case, the virtual card is generated electronically and is not reduced to a physical plastic card.

In FIG. 2, some exemplary amounts are presented to demonstrate how the fees are calculated. The provider bills $2,000 to an insurance company which has the TPA adjudicate 30 the claim. The TPA determines that under the insurance policy, $1,500 is authorized for payment 40 while the remaining $500 is the responsibility of the patient. In an embodiment of the invention the patient is given a window of opportunity to pay his or her responsibility to the intermediary, and if payment is timely received, the intermediary combines both the $1,500 TPA-authorized payment and $500 patient-authorized payment into a $2,000-authorized virtual payment card sent to the provider to satisfy the entire outstanding balance. However, in FIG. 2 we will assume that the provider bills 50 the patient $500. The patient already has keyed in his or her data into patient portal 60 so the $500 payment authorization to the provider is easy and fast. The acquiring platform determines from association data tables that the interchange fee for the patient's payment card is 1.5%. Therefore, on a $500 charge the interchange fee is $7.50 on the first transaction. The intermediary has the ability to select the virtual card account type it wants to submit to the service provider. Therefore, the intermediary will want to submit one with a higher interchange rate than 1.5%. Otherwise, there is no profit in facilitating payments to the provider. In our example, the virtual card interchange rate is 2.65%. On a $500 payment 2.65% yields an interchange fee of $13.25 which is received by Issuer Bank 190 (which flows back to the intermediary who effectively issued the virtual card).

Figure 3:
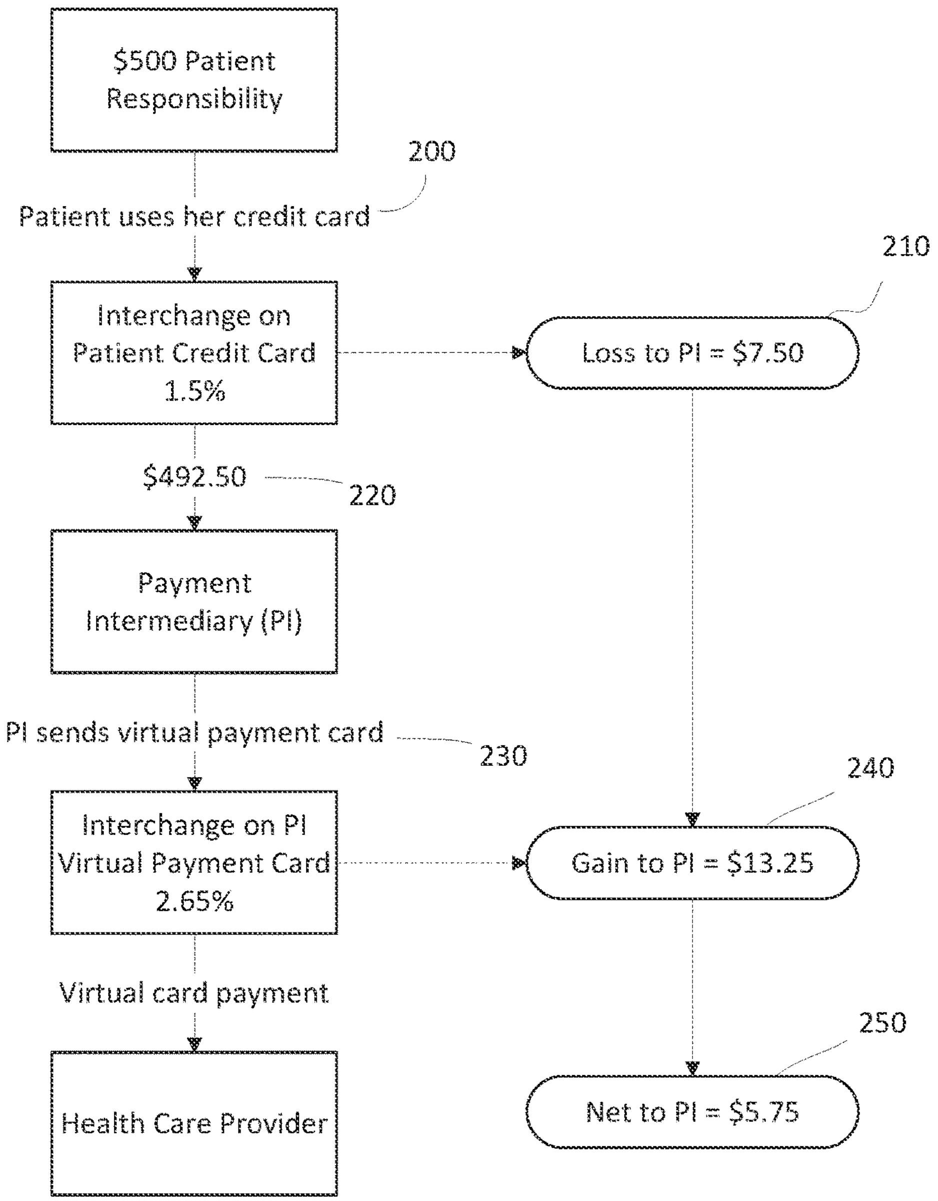
FIG. 3 is a diagrammatic view of an embodiment of the invention for patient card payment using an example payment amount to show profit and loss at stages.

The loss-to-profit cycle of FIG. 2 is illustrated in FIG. 3 wherein the $500 payment 200 from patient's personal credit card to intermediary incurs as $7.50 loss 210. The intermediary effectively receives only $492.50 (reference 220) but owns the health care provider $500. However, the intermediary submits to health care provider a virtual payment card having an interchange of 2.65%. When the provider processes the virtual payment card (second transaction, reference 230) the interchange on the $500 is $13.25 (reference 240). This nets the intermediary a profit of $5.75 (reference 250).

Figure 4:
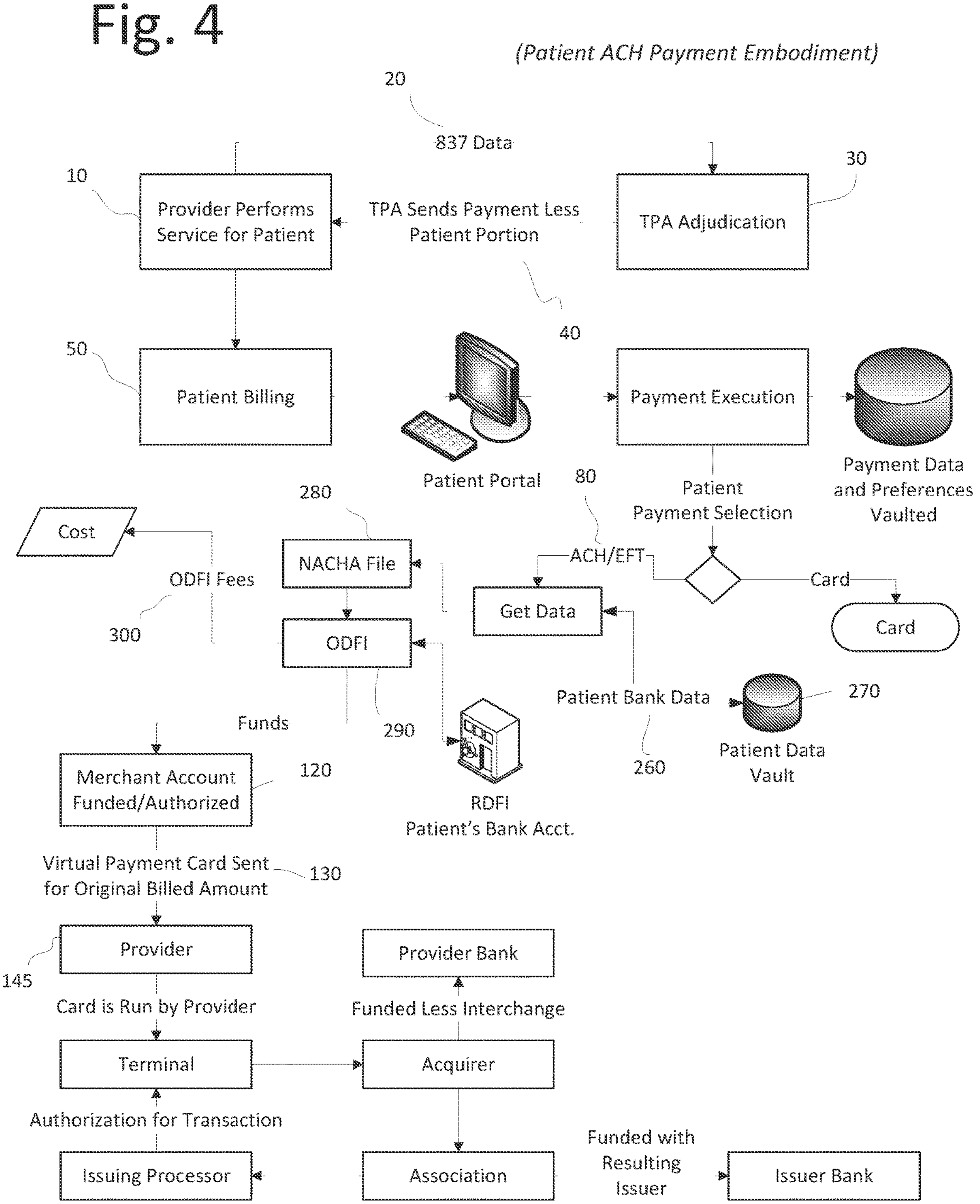
FIG. 4 is a diagrammatic view of an embodiment of the invention for patient ACH payment.

In FIG. 4, a similar process is shown except the patient selected ACH/EFT 80 as the payment preference. This means funds to pay the intermediary are drawn from a bank account using automated clearinghouse/electronic funds transfer. The patient's bank data 260 for the ACH is vaulted 270 for future use. A NACHA-compliant-file 280 is generated for the ACH transaction and sent to Originating Depository Financial Institution (ODFI) 290.

In the ACH flow, the ODFI 290 acts as the interface between the Federal Reserve or ACH network and the originator of the transaction. The ODFI warrants to the ACH network that the transactions it transmits to the network comply with the rules. An ODFI fee (reference 300) is incurred for this service. The funds are received by the intermediary 120 which then generates a virtual payment card 130 for a second transaction by the provider 145.

Figure 5:
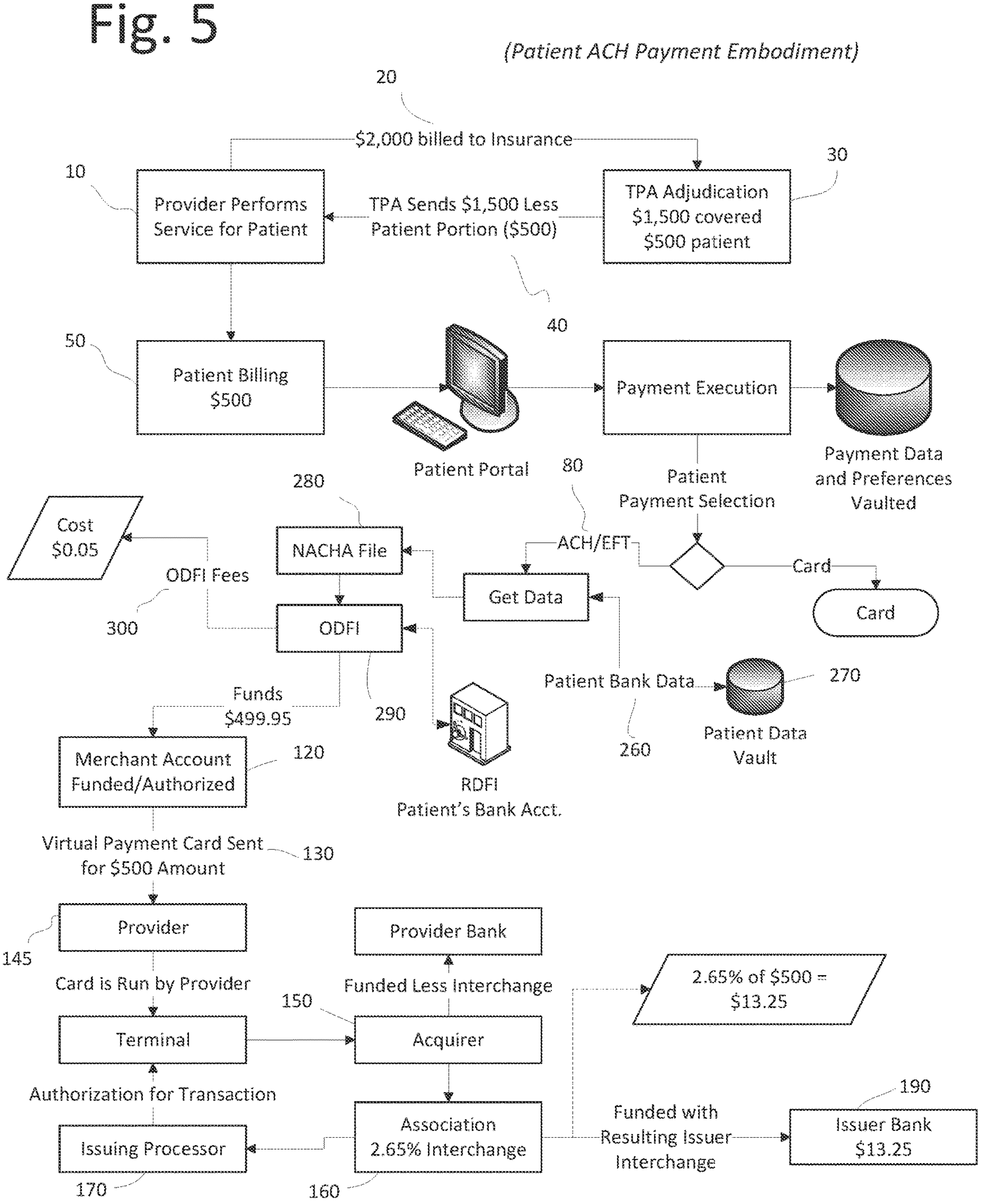
FIG. 5 is a diagrammatic view of an embodiment of the invention for patient ACH payment using an example payment amount.
Figure 6:
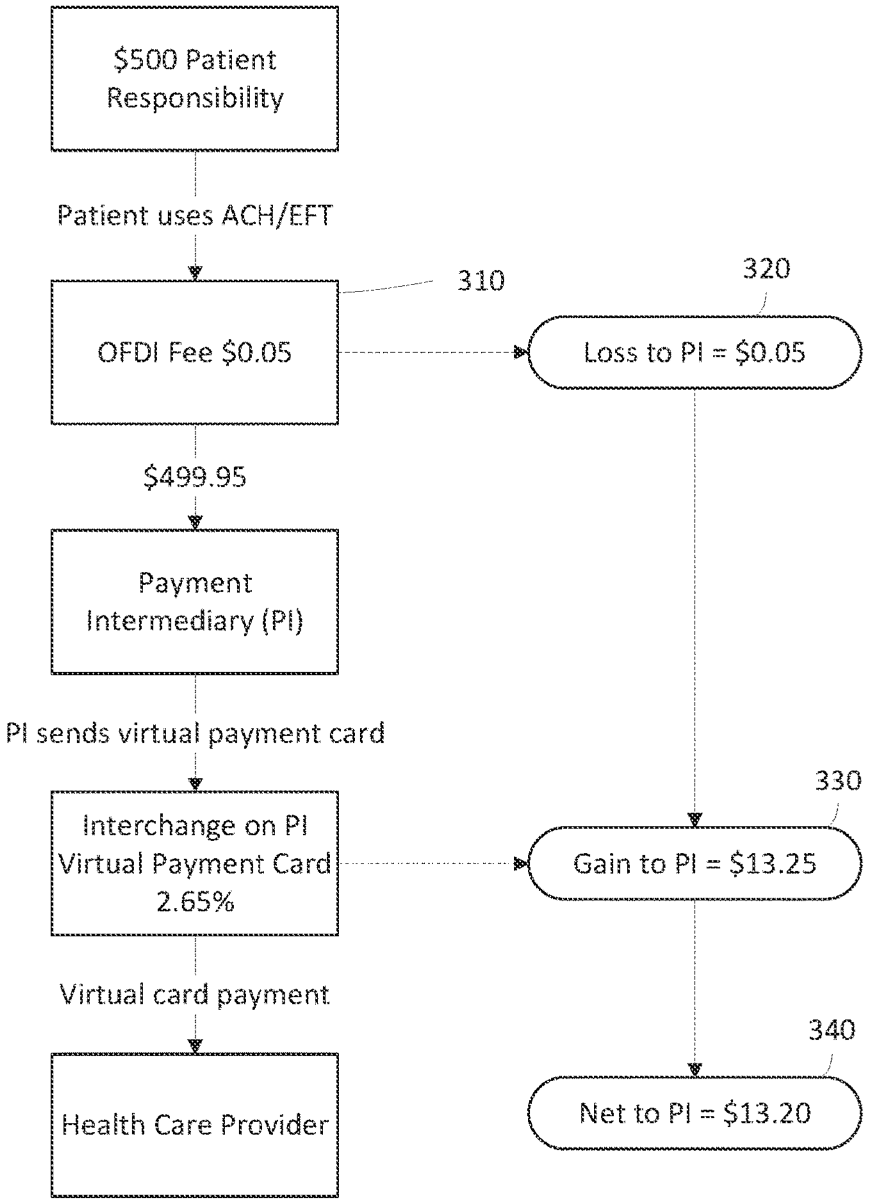
FIG. 6 is a diagrammatic view of an embodiment of the invention for patient ACH payment using an example payment amount to show profit and loss at stages.

FIG. 5 illustrates the ACH embodiment of the invention wherein the ODFI fees (reference 300) are $0.05 and intermediary effectively receives $499.95. Using the same 2.65% interchange rate on the $500 virtual card payment to the provider, the intermediary/issuer receives $13.25 from the second transaction. In FIG. 6, the ODFI fees takes $0.05 (reference 310) from the original $500 transaction between patient and intermediary. This is a loss 320 to intermediary of $0.05. In the second transaction from intermediary to provider, the 2.65% interchange on $500 yields $13.25 as interchange income 330 to the intermediary. The net profit 340 on the entire transaction flow to the intermediary is $13.20.

Figure 7:
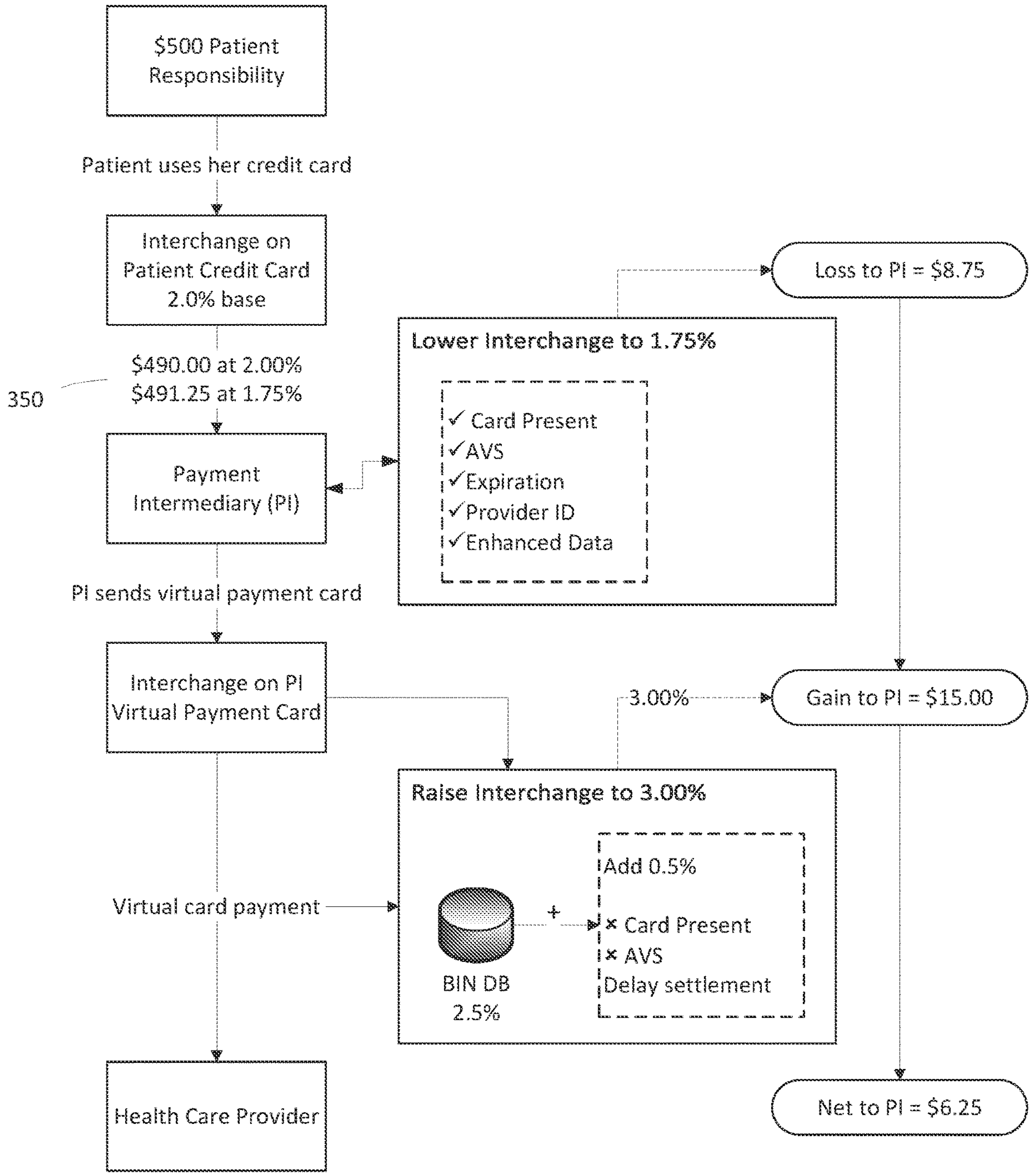
FIG. 7 is a diagrammatic view of an embodiment of the invention for patient card payment using an example payment amount to show profit and loss at stages wherein the virtual payment card interchange is automatically modified.

FIG. 7 shows an embodiment of the invention wherein the interchange rate on the first transaction (between patient and intermediary) and the second transaction (between intermediary and provider) is adjusted by the intermediary. When a patient uses her own credit card there is a default interchange rate for that particular card. However, by presenting the transaction directly to intermediary as an acquirer, the transaction may be run as a card present. The patient portal may also solicit a substantial amount of information for address verification, enhanced data and the like to lower the risk of the transaction and the interchange fee. The transaction batch is run timely and the provider ID is included with the transaction. All these factors lower (reference 350) the interchange rate in our example from a base of 2.00% to 1.75%. That effectively increases the profit to intermediary by $1.25.

By the same token, the interchange rate incurred on the second transaction (intermediary to provider via virtual payment card) can be increased by paying the provider as a straight through transaction and presenting it as a card not present, not including AVS and delaying settlement. Even if the virtual card is faxed, emailed, mail or otherwise manually keyed into the provider's terminal, the intermediary can select a virtual card product having a target interchange rate (in almost all cases, greater than the interchange incurred by the first transaction).

Figure 8:
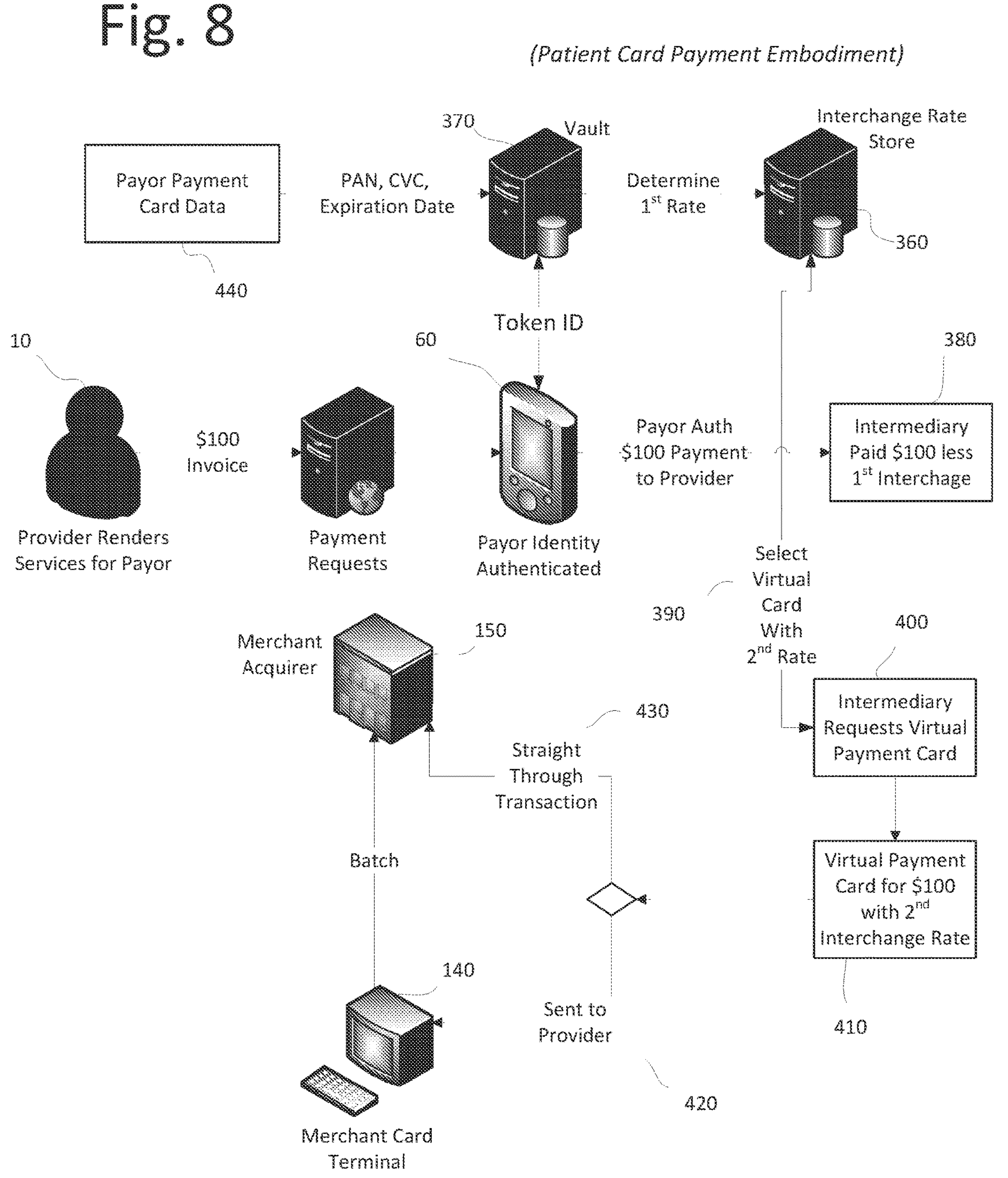
FIG. 8 is a diagrammatic view of an embodiment of the invention showing the vaulting of a payor card and the process of paying the intermediary incurring the interchange rate inherent to the payor's card and then the intermediary paying a provider incurring a selected, second interchange rate.

In FIG. 8, payor payment card data 440 is vaulted 370. The card data 440 includes the PAN, CVC, and expiration date. The payment card typically would be a credit card but could include other cards such as health savings cards, debit cards, prepaid cards, check cards and the like. By vaulting 370 the data, the payor, through this invention, is able to have an intermediary make payments on its behalf without exposing the payor's personal card data. This is analogous to bill pay services offered by banks. Instead of sending a personal check to a vendor which increases the chances the check could be forged, duplicated, or otherwise stolen to the detriment of the individual checking account holder, the bill pay system uses a third party to issue checks that do not contain the checking account information (e.g., routing and account numbers) of the individual payor. However, unlike the check bill payment system (which banks can sometimes substitute ACH transactions over paper checks), the individual payor in the present invention does not have to give out his or her bank account information. In addition, the payor can use his or her credit card to make payments for the services instead of requiring all the money to be immediately available in a bank account. Finally, the payor may use his or her credit card to accumulate points and benefits such as merchandise, frequent flyer miles or the like.

Despite all these benefits to the payor, the intermediary processor faces the hurdle of having to overcome the initial loss on the first transaction. Therefore, under the current invention, an interchange rate store 360 is accessed to determine what interchange rates will be incurred on transactions. The rate store 360 may be any electronic database system able to receive a query and return a result value. Interchange rates are published by card networks so that merchants understand what costs are incurred by accepting payment cards for commerce.

Still referencing FIG. 8, provider 10 sends an invoice for $100 for services rendered to payor. Payor is presented with the invoice through an electronic user interface 60 through which the payor is authenticated as the proper user. The electronic user interface 60 may include, but is not limited to, a smart phone application, a web browser, a client-side application, or the like. The payor may be authenticated by username/password, biometric signature, or similar means. However, the payor payment card data 440 has been vaulted and is maintained securely by, or at the direction of, intermediary processor. The card data itself is represented by a token ID which alone is insufficient to process the payment card data fraudulently. In the example show, payor authorizes a $100 payment to provider through interface 60. In step 380, the intermediary receives a net portion of the $100 due to the first interchange rate incurred on the transaction. Intermediary now has an obligation to pay $100 to provider 10. Intermediary requests a virtual payment card 400 selected from those available 390 with a second interchange rate higher than the first rate which was inherent in the payor payment card. Intermediary processor may also conduct the first payment to themselves in a manner that decreases the first interchange rate such as running the payment card as a card present with AVS, expiration, and provider ID data. Intermediary may also include enhanced data to further decrease the first interchange rate and thus keep more of the initial $100 payment to themselves.

A virtual payment card for $100 with a second, generally higher interchange rate is then transmitted to the provider for payment. This may be done by sending the virtual payment card directly 420 to provider to run the data through a merchant card terminal 140. Alternatively, intermediary may send the virtual payment card data as a straight through transaction 430 to merchant acquirer. In either case, the virtual payment card is generated electronically and is not reduced to a physical plastic card.

In an embodiment of the invention, the intermediary payment processor includes a description of the third party payee (e.g., service provider) in the description of charges for the first payment transaction. This allows the payor to reconcile his or her payment card charges knowing that the intermediary has satisfied the appropriate payment obligations of the payor. This information would show up on the electronic portal for the payor's payment card and/or in a hardcopy statement received in the mail. The statement may include data received from the service provider (or third party payee) such as invoice number, description of goods or services, identity of the service provider or the like. It is useful for the intermediary to pass this information on to the payor rather than simply list on the statement a "generic" charge.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk, or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

Glossary of Claim Terms

Authentication: is any process by which a system verifies the identity of a user who wishes to access it. Since access control is normally based on the identity of the user who requests access to a resource, authentication is essential to effective security.

Authorization Approval Code: is a numerical code assigned to a sales transaction indicating that the sale is authorized.

AVS: is address verification services. AVS uses the billing information associated with a card to verify the cardholder's address.

Bank Account Information: information used to identify a specific bank account. This information can include routing numbers, account data, account numbers and other information used to identify a bank account.

BIN: is a six-digit Bank Identification Number assigned to each federally insured financial institution for the routing of transactions and other purposes. It is also known as an Issuer Identification Number (IIN) the first digit of which is the Major Industry Identifier (MII).

Card Association: a collective network of both the card network and the banks that issue cards operable on the network's infrastructure.

Card Network: financial networks that administer the credit and debit card processing. These networks include those known by the brands VISA, MASTERCARD, AMERICAN EXPRESS, DISCOVER, DINER'S CLUB, and JCB.

Card Verification Code (CVV): is numeric security code that provides extra security against unauthorized use during non-face to face transactions. CVV codes are three-digit numbers on the back of VISA and MASTERCARD credit and debit cards. The CVV number helps guard against the use of data stolen from payment networks by hackers. Intercepted data will usually comprise the cardholder's name, card number and card expiration date, but not the CVV, which is generally obtained only by viewing the physical card.

CNP Transaction: is a "card not present" transaction such as payments taken over the Internet or by phone or mail.

Computer Based Server: a computer hardware system dedicated to running one or more services. Services can vary from database server, file server, mail server, print server, web server, or various other types of services achieved through a computer program.

Computing Device: a computer hardware system typically connected by a wide area or local area network to transmit data, receive data, and store (either ephemerally or permanently) said data in conjunction with its programming Computing device may also perform business logic, calculations, and present data by various media.

Delayed Settlement: merchants have to settle transactions within a specific amount of time after authorization to avoid interchange downgrades (i.e., increases in interchange fees). The maximum period varies for everyone and is determined by industry, transaction type, channel used, and more.

Digital Storage Medium: is any data repository able to save non-transitory information. This is typically or more hard drives operable by a relational database.

EDI: Electronic Data Interchange.

EFT: Electronic Funds Transfer.

Electronic Remittance Advice (ERA): Any of several electronic formats for explaining the payments of health care claims.

Enhanced Data: Additional data submitted by a merchant through a credit card network that typically lowers the interchange rate incurred for the transaction. Enhance data includes sales tax breakdown, customer references, merchant order numbers, transportation information, hotel accommodation information, car rental data, product codes, item descriptions, item quantities, item units, discount amounts, shipping information and the like. This additional data is known as Level II and Level II data.

Explanation of Benefits (EOB): is a statement typically sent by a health insurance entity explaining what medical services were covered under an insurance policy. An EOB will typically include a summary of the services performed, the medical provider's fee and the amount a patient is responsible for.

Fax: is short for facsimile. It is a method of sending image data across the standard phone line to another fax machine. It is considered by many service providers a relatively secure means of transmitting and receiving sensitive financial and medical information.

First Payment: is the initial transaction made by the card processor to the service provider using a virtual card payment which. The processing of that transactions enables the card processor to capture information necessary to make subsequent payments directly to the acquirer of the service provider thereby avoiding the need to generate virtual card payments and have those payments manually processed by the service provider.

FTP: (file transfer protocol) is an Internet protocol used to copy files between computers—usually a client and an archive site. For the purposes of this application this includes encrypted variants such as Explicit FTPS, SSH File Transfer Protocol and tunneling a normal FTP session over an SSH connection.

Health Care Claim: refers to an electronic transition standard code 837 as defined by X12. Variants of the 837 code include 837i for institutional health care claims; 837p for professional health care claims; and 837d for dental health care claims.

Health Care Claim Payment (835): refers to an electronic transition standard code 835 as defined by X12 for a health care claim payment and remittance advice.

HTTP: (hypertext transfer protocol) is the protocol used to transmit and receive all data over the World Wide Web. HTTPS is a secure variant of HTTP.

IIN: a six-digit Issuer Identification Number (IIN) (also known as the "Bank Identification Number" (BIN)) the first digit of which is the Major Industry Identifier (MII).

Independent Sales Organization (ISO): A company or individual contracted with a payment card processor or acquirer to acquire new merchants. Many ISOs provide customer support, technical support, and installation support to their customers on behalf of the acquirer.

Interchange Rate: the fee paid between banks for the acceptance of credit and/or debit card based transactions. The interchange rate may be greater for certain transactions including, but not limited, those wherein the physical card is not present at the point-of-sale card terminal. The interchange rate may include a percentage of the transaction, a fixed fee or a combination of both. By way of example, the Apr. 18, 2015 rates published by VISA (Visa USA Interchange Reimbursement Fees) provide that a Signature Business Credit payment card includes a 2.40% interchange rate on the amount of the transaction plus a $0.10 transaction fee for "Business Retail." If the business card is not present then the interchange rate is 2.60% plus a $0.20 transaction fee.

Intermediary Payment Processor: an entity that accepts payment in a first transaction from a payor and in turn, through a second transaction, makes payment to a third party payee designated by the payor.

Issuing Bank: the bank that issues a credit, debit or stored value card to a consumer. This may be synonymous with the card processor in the context of the current claims. This is typically the cardholder's financial institution but in the case of a payment processor, the issued cards may be that of the processor.

Local Client Application Integration: means payment intermediary directly or by direction of other services or applications sends or makes available payment data to a software application running or accessible by the payee and/or payor. By way of example, a web service that delivers XML data to a WINDOWS brand operating system application loaded on a computer at a health care provider's office provides notification and reconciliation of straight through payments made by payment intermediary to the merchant acquirer for the health care provider, the data including the date, amount and payor information of the payments made.

Message: generally, means an object of communication or vessel which provides information.

Payee: is the recipient of the payment card funds. In health care, this may be the service provider (e.g., physician's office). For automobile warranties, this may be the mechanic or service department. For travel, the payee may be a hotel, airline or the traveler whose itinerary is often managed on his or her behalf.

Payor: In health care, an entity that assumes the risk of paying for medical treatments. This can be an uninsured patient, a self-insured employer, or a health care plan or HMO. Payor may also be used in other industries such as automobile warranty claims and travel services (such as paying for an employee's hotel room or airline ticket). These examples are illustrative and should not be construed as limiting a payor beyond its plain meaning.

Payment Card: refers to any credit card, debit card, stored value card or the like.

Payment Receipt: refers to a transmission made by fax, email, or the like confirming that a direct payment has been made from the card processor to the acquirer for the service provider's merchant account. The payment receipt may be a merger of an authorization code, amount paid, date of payment, payer identity and an explanation of benefits into a single file or document.

Personal Information: information that can be used to uniquely identify, contact, or locate a single person or can be used with other sources to uniquely identify a single individual.

Personal Identification Number (PIN): A number used by a cardholder to authorize card payments. A PIN debit is a debit card transaction authorized by the cardholder using a personal identification number.

PCI DSS: is an acronym for the payment card industry data security standard. PCI DSS is a security standard for organizations that handle cardholder information.

Second Payment: is made by the card processor directly to the acquirer of the service provider's merchant account. This avoids the need to have the service provider manually process a virtual card payment.

Service Provider: refers to the entity that provides services to be paid for. Service providers applicable to the current invention may include, but are not limited to, construction contractors, vehicle repair shops, pharmacies, and medical service providers.

SMS: (short message service) is a wireless technology for sending short text messages between mobile phones, fax machines, and IP addresses. It's similar to paging, except that the recipient's phone doesn't need to be active; instead, the message is stored.

SMTP: Simple Mail Transfer Protocol is used to send email. The SMTP protocol provides a common language for different servers to send and receive email messages. The default TCP/IP port for the SMTP protocol is port 25.

Standard Industrial Classification (SIC) code: is a United States government system for classifying industries by a four-digit code. This is also known as a Merchant Category Code (MCC).

Storage Device: is an electronic storage medium such as a hard drive, hard drive array, solid state memory, magnetic tape, and optical drives whether local or remotely located (e.g., in the cloud).

Stored Value Card: are those payment cards (in tangible or virtual form) which have a monetary value stored on them. Whereas the prepaid credit card can only be used with authorization from the cardholder, the stored value cards have an anonymous aspect. Examples of stored-value cards include the well-known telephone cards, merchant gift cards, or prepaid debit cards.

Straight-Through Transaction: are payments made directly between the intermediary payment processor and a merchant acquirer for the third party payee. For example, instead of sending a faxed virtual card payment to a merchant who would then key in the virtual card data into a card terminal at the business location, the payment processor would directly transmit payment to the merchant acquirer for that merchant. In such cases, the merchant would typically only find out about the payment after-the-fact because the merchant did not have to swipe, key in or otherwise handle any payment card data to receive payment.

Token ID: is an identification value used in place of the payor's payment card data. The token ID is a unique link to the more financially sensitive payment card number, expiration date and security code. A token ID by itself cannot process a credit card transaction and therefore provides a layer of security to the card holder. It may be an integer, string or a GUID. GUIDs are usually stored as 128-bit values, and are commonly displayed as 32 hexadecimal digits with groups separated by hyphens, such as {21EC2020-3AEA-4069-A2DD-08002B30309D}. They may or may not be generated from random (or pseudo-random) numbers. GUIDs generated from random numbers normally contain 6 fixed bits (these indicate that the GUID is random) and 122 random bits; the total number of unique GUIDs is $2^{122}$ (approximately $5.3\times10^{36}$). This number is so large that the probability of the same number being generated randomly twice is negligible; however other GUID versions have different uniqueness properties and probabilities, ranging from guaranteed uniqueness to likely duplicates.

Vaulting: is the process of saving typically sensitive payment card data into a secure database for later use, particularly for subscription and recurring payments.

Virtual Payment Card: are payment cards that are generated electronically and not reduced to a physical plastic card. Virtual payment cards may be processed by a service provider as a CNP transaction or the data may be transmitted directly to the card acquirer for the service provider which in such case the CNP designation may or may not be included.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A computer-implemented method comprising:

vaulting, by one or more processors and into a secure database, payment card data of a payment card associated with a payor, wherein the payment card is associated with a first interchange rate that is based on inclusion or exclusion of interchange factors, the payment card data comprises a card number, an expiration date, a security code, and the payment card is associated with one or more fraud prevention properties;

initiating, by one or more processors, a first transaction to process the payment card data for an amount authorized by the payor to a payee;

determining, by the one or more processors, an initial second interchange rate associated with processing the payment card data via a second transaction with the payee;

responsive to determining that the initial second interchange rate is less than the first interchange rate, determining, by the one or more processors, one or more required interchange factors to include in a virtual payment card used for the second transaction, wherein including the one or more required interchange factors in the virtual payment card increases the initial second interchange rate to a second interchange rate that is greater than the first interchange rate;

generating, by the one or more processors, the virtual payment card in the amount authorized by the payor to the payee and with the one or more required interchange factors to ensure that the second interchange rate is greater than the first interchange rate, wherein the virtual payment card is not reduced to a physical card, wherein the virtual payment card is represented by a token ID that is (1) indicative of an identification value used in place of the card number, the expiration date, and the security code of the payment card data and (2) prevents processing the virtual payment card fraudulently;

transmitting, by the one or more processors, directly to a merchant acquirer associated with the payee and without transmitting the card number, expiration date, and security code to the payee, the second transaction that includes the virtual payment card such that the payment card data of the payor is not exposed to the payee; and receiving, by the one or more processors, payment based on a difference between the first interchange rate and the second interchange rate.

2. The computer-implemented method of claim 1, wherein transmitting the second transaction includes confirming that the difference between the first interchange rate and the second interchange rate satisfies a threshold.

3. The computer-implemented method of claim 1, further comprising:

selecting a Bank Identification Number (BIN) comprising a preset interchange rate greater than the first interchange rate.

4. The computer-implemented method of claim 1, wherein the one or more required interchange factors comprise one or more of card not present, enhanced data, debit personal identification number, address verification service, security code, or delayed settlement.

5. The computer-implemented method of claim 1, further comprising:

prior to initiating the first transaction, authenticating a payor identity associated with the payor through an electronic user interface, wherein the payor identity is associated with the token ID.

6. The computer-implemented method of claim 1, further comprising:

receiving, from the payor, a future payment rule comprising one of a pre-authorization for a single payment amount or a pre-authorization for a recurring payment schedule.

7. The computer-implemented method of claim 6, further comprising:

receiving a subsequent request for a subsequent payment to a third party payee; and validating the subsequent request against the future payment rule.

8. The computer-implemented method of claim 7, further comprising:

processing the subsequent request only upon determining that a third interchange rate associated with the subsequent request exceeds the first interchange rate.

9. The computer-implemented method of claim 1, further comprising:

embedding an alphanumeric description of the payee and the first transaction in a statement document associated with the payment card.

10. The computer-implemented method of claim 1, wherein the card number, the expiration date, and the security code are sensitive data and the token ID comprises a unique link to the sensitive data.

11. The computer-implemented method of claim 10, wherein the token ID comprises a pseudo-random generated 128-bit data structure.

12. The computer-implemented method of claim 11, wherein the token ID is displayable as 32 hexadecimal digits with groups separated by hyphens.

13. The computer-implemented method of claim 1, wherein initiating the first transaction includes processing the payment card data as a card present transaction with address verification service data, expiration date data, and provider identification data to decrease the first interchange rate.

14. A system comprising one or more processors; and one or more memories storing processor executable instructions that, when executed by the one or more processors, cause the one or more processors to perform operations comprising:

vaulting, into a secure database, payment card data of a payment card associated with a payor, wherein the payment card is associated with a first interchange rate that is based on inclusion or exclusion of interchange factors, and the payment card data comprises a card number, an expiration date, a security code, and the payment card is associated with one or more fraud prevention properties;

initiating a first transaction to process the payment card data for an amount authorized by the payor to a payee;

determining an initial second interchange rate associated with processing the payment card data via a second transaction with the payee;

responsive to determining that the initial second interchange rate is less than the first interchange rate, determining one or more required interchange factors to include in a virtual payment card used for the second transaction, wherein including the one or more required interchange factors in the virtual payment card increases the initial second interchange rate to a second interchange rate that is greater than the first interchange rate;

generating the virtual payment card in the amount authorized by the payor to the payee and with the one or more required interchange factors to ensure that the second interchange rate is greater than the first interchange rate, wherein the virtual payment card is not reduced to a physical card, wherein the virtual payment card is represented by a token ID that is (1) indicative of an identification value used in place of the card number, the expiration date, and the security code of the payment card data and (2) prevents processing the virtual payment card fraudulently;

transmitting, directly to a merchant acquirer associated with the payee and without transmitting the card number, expiration date, and security code to the payee, the second transaction that includes the virtual payment card such that the payment card data of the payor is not exposed to the payee; and receiving payment based on a difference between the first interchange rate and the second interchange rate.

15. The system of claim 14, wherein transmitting the second transaction includes confirming that the difference between the first interchange rate and the second interchange rate satisfies a threshold.

16. The system of claim 14, wherein the operations further comprise:

selecting a Bank Identification Number (BIN) comprising a preset interchange rate greater than the first interchange rate.

17. The system of claim 14, wherein the one or more required interchange factors comprise one or more of card not present, enhanced data, debit personal identification number, address verification service, security code, or delayed settlement.

18. One or more non-transitory computer-readable media storing processor-executable instructions that, when executed by one or more processors, cause the one or more processors to perform operations comprising:

vaulting, into a secure database, payment card data of a payment card associated with a payor, wherein the payment card is associated with a first interchange rate that is based on inclusion or exclusion of interchange factors, and the payment card data comprises a card number, an expiration date, a security code, and the payment card is associated with one or more fraud prevention properties;

initiating a first transaction to process the payment card data for an amount authorized by the payor to a payee;

determining an initial second interchange rate associated with processing the payment card data via a second transaction with the payee;

responsive to determining that the initial second interchange rate is less than the first interchange rate, determining one or more required interchange factors to include in a virtual payment card used for the second transaction, wherein including the one or more required interchange factors in the virtual payment card increases the initial second interchange rate to a second interchange rate that is greater than the first interchange rate;

generating the virtual payment card in the amount authorized by the payor to the payee and with the one or more required interchange factors to ensure that the second interchange rate is greater than the first interchange rate, wherein the virtual payment card is not reduced to a physical card, wherein the virtual payment card is represented by a token ID that is (1) indicative of an identification value used in place of the card number, the expiration date, and the security code of the payment card data and (2) prevents processing the virtual payment card fraudulently;

transmitting, directly to a merchant acquirer associated with the payee and without transmitting the card number, expiration date, and security code to the payee, the second transaction that includes the virtual payment card such that the payment card data of the payor is not exposed to the payee; and receiving payment based on a difference between the first interchange rate and the second interchange rate.

19. The one or more non-transitory computer-readable storage media of claim 18, wherein transmitting the second transaction includes confirming that the difference between the first interchange rate and the second interchange rate satisfies a threshold.

20. The one or more non-transitory computer-readable storage media of claim 18, wherein the operations further comprise:

selecting a Bank Identification Number (BIN) comprising a preset interchange rate greater than the first interchange rate.

21. The one or more non-transitory computer-readable storage media of claim 18, wherein the one or more required interchange factors comprise one or more of card not present, enhanced data, debit personal identification number, address verification service, security code, or delayed settlement.

* * * * *